Nov. 5, 1957 D. T. AYERS, JR., ET AL 2,811,868
BRAKE OPERATING MECHANISM
Filed June 26, 1953 2 Sheets-Sheet 2
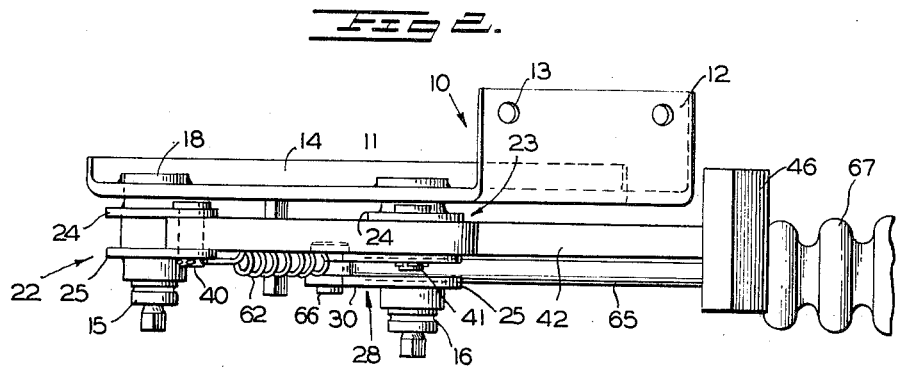
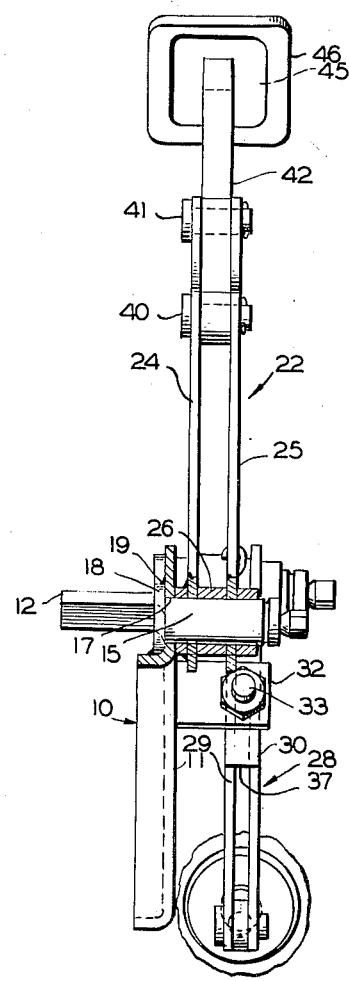
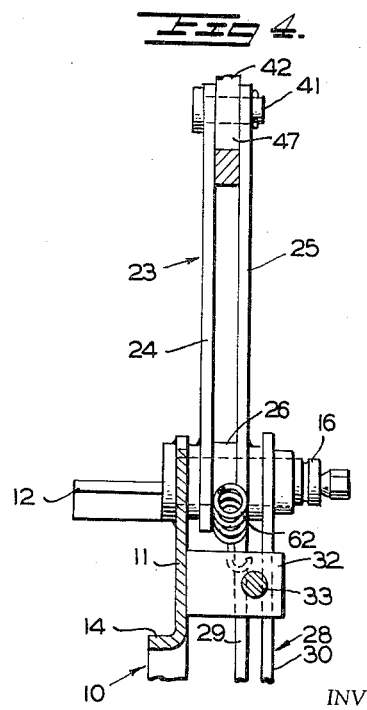
INVENTORS
DAVID T. AYERS JR.
CARL CHAKMAKIAN
BY John V. Phelps
ATTORNEY

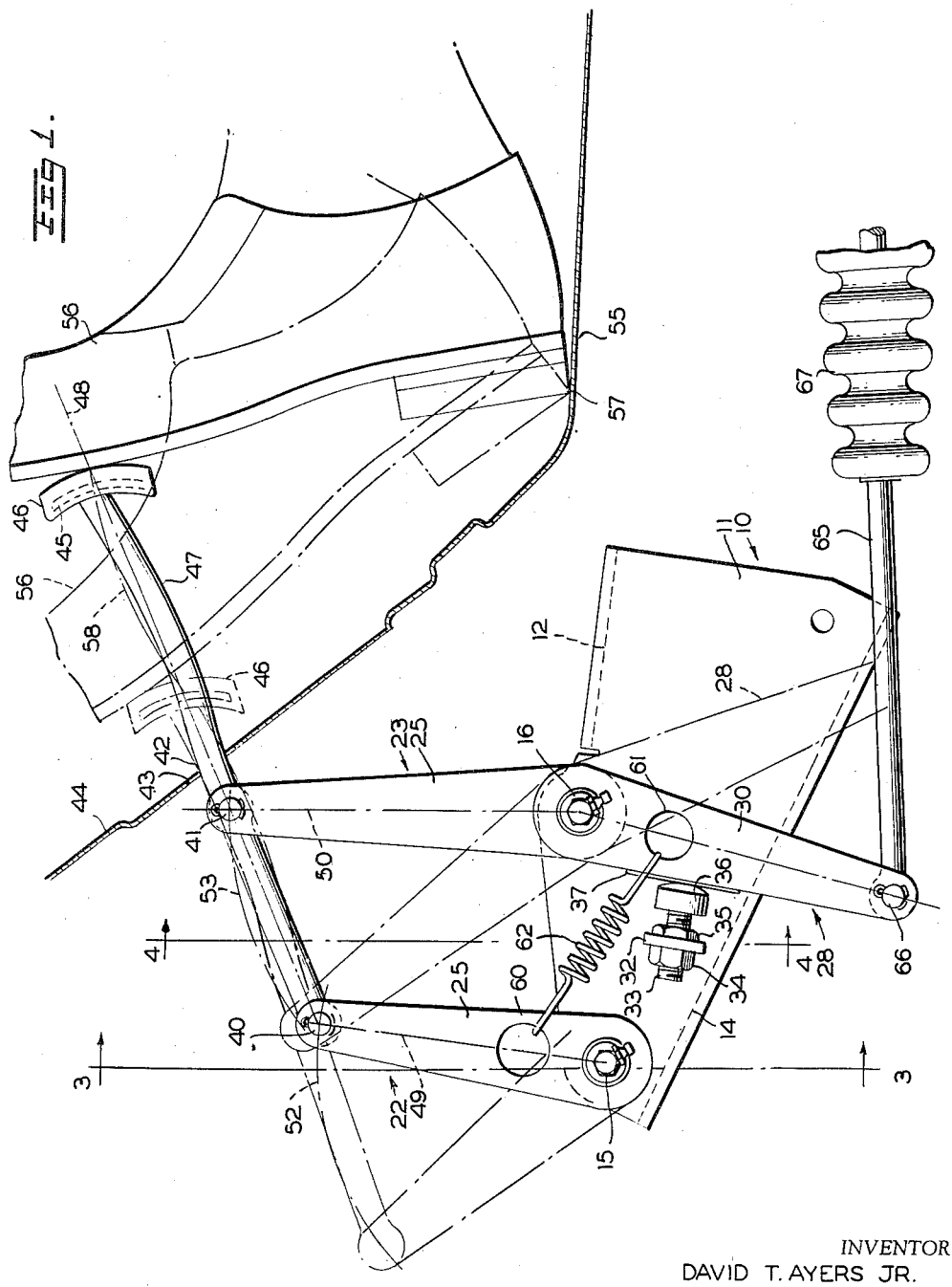

United States Patent Office 2,811,868
Patented Nov. 5, 1957

2,811,868

BRAKE OPERATING MECHANISM

David T. Ayers, Jr., Birmingham, and Carl Chakmakian, Dearborn, Mich., assignors to Kelsey-Hayes Company, a corporation of Delaware Application June 26, 1953, Serial No. 364,282

2 Claims. (Cl. 74—512)

This invention relates to a brake operating mechanism for motor vehicles.

In both conventional hydraulic brake mechanisms and power operated braking systems it has been the custom for many years to arrange the brake pedal adjacent the throttle treadle, but at a much higher point, to provide the necessary leverage for operating the brakes. A motor vehicle operator, therefore, when releasing the throttle and applying the brakes was required to lift his right foot a substantial distance to place it on the brake pedal. These pedals are pivoted on axes beneath the floor boards or were mounted for movement in other ways so that the pedal pad would move in a path which was convenient from the standpoint of the mechanical mounting of the pedal without regard to movement of the operator's foot. The latter consideration was of no importance, however, since it was necessary for the operator to lift his foot wholly free of the floor board of the vehicle and accordingly his foot was free to follow the path of travel of the pedal pad, no matter what such path would be.

In later power brake installations, the desire to provide ease of operation has resulted in a trend toward the placing of the accelerator pedal or treadle at a much lower point, it being unnecessary to provide the relatively long leverage previously used in brake pedal travel. With such later constructions, it was possible for the operator to release the throttle and then move his foot directly sideways into position on the brake pedal or treadle without the necessity of having to lift his foot. It was, therefore, possible for the operator to leave the heel of his shoe in engagement with the floor board of the vehicle both in transferring the foot to the brake pedal and in operating the pedal. However, while it is possible for an operator to rock his right foot with the heel of the shoe in engagement with the floor board to form a fulcrum point for depressing the accelerator treadle, such rocking of the foot about a fixed point has not been possible with brake operating pedals or treadles since the path of movement of the element of the pedal or treadle with which the operator's foot engaged was not an arcuate path concentric with the rocking point of the heel of the shoe on the floor board. As a matter of fact, the path of movement was quite different and involved mostly a forward motion so far as the operator's foot was concerned, and this required the operator to slide the foot forwardly and elevate it from contact with the floor board in applying the brake. In a return movement, the heel of the shoe would drag on the floor board if an attempt were made to operate the brake pedal without lifting the foot. It is, therefore, necessary to lift the foot out of contact with the floor board in order to apply the brake, thus sacrificing a substantial degree of the ease intended to be provided in the operation of low brake pedals or treadles.

An important object of the present invention is to provide a novel brake operating mechanism associated with the treadle or pedal in such manner that the operator is enabled to leave the heel of the shoe in contact with the floor board to rock substantially about a fixed pivot point in applying and releasing the brakes through operation of the pedal or treadle.

A further object is to provide a novel type of link and lever mechanism for transmitting movements of the brake pedal or treadle to a booster brake mechanism and wherein movement of the pedal pad is such as to render it unnecessary to substantially move the heel of the foot from a fixed point of contact with the floor board in applying and releasing the brakes.

A further object is to provide such a mechanism wherein the brake pedal is not in the form of a lever mounted to turn on a fixed axis but rather is in the form of an operating rod connected to a booster brake mechanism through a novel link and lever arrangement by which the pedal pad is caused to travel in approximately an arc of a circle concentric with a point on the floor board at which the operator will normally engage the heel of his shoe in operating the brakes.

A further object is to provide such a mechanism wherein a parallelogram arrangement of parts is provided having a pair of arms pivotally supported at spaced points and pivotally connected at spaced points to the brake pedal rod, thus predetermining the desired path of travel of the pedal pad, and to connect one of the pivot arms to a rod extending to the booster brake mechanism to operate the latter in accordance with movements of the pedal pad.

Other objects and advantages of the invention will become apparent during the course of the following description.

In the drawings we have shown one embodiment of the invention. In this showing:

Figure 1 is a side elevation of the mechanism shown in solid lines in the "off" brake position, the floor and toe board of the vehicle being fragmentarily shown together with the connection of the lever mechanism to a rod leading preferably to a booster brake mechanism.

Figure 2 is a plan view of the same, the toe and floor board being omitted.

Figure 3 is a sectional view on line 3—3 of Figure 1, and

Figure 4 is a similar view on line 4—4 of Figure 1.

Referring to the drawings the numeral 10 designates a main supporting bracket preferably in the form of a steel stamping having a vertical wall 11 shaped in profile as shown in Figure 1. The upper portion of this bracket is provided with an inwardly extending upper flange 12 having openings 13 for the reception of bolts for securing the bracket rigidly to a frame member of the vehicle (not shown). The brackets at its edges, for example along the lower edge, may be suitably reinforced by one or more edge flanges 14.

The vertical bracket wall 11 supports a pair of stub shafts 15 and 16, both of which may correspond in structure and arrangement to the showing of the shaft 15 in Figure 3. This shaft projects through an opening 17 in the vertical flange 11 and is provided with a head 18 welded to the vertical flange 11 as at 19. Accordingly it will be apparent that the stub shafts 15 and 16 are rigidly supported in spaced parallel relation to the bracket 10.

Arm units 22 and 23 are mounted to turn on the respective stub shafts 15 and 16, these units, except as noted below, preferably being identical. Each arm unit comprises inner and outer arms 24 and 25 suitably hubbed for mounting on the associated stub shaft and provided therebetween with a spacer sleeve 26 as shown in Figure 3.

The stub shaft 16 is somewhat longer than the shaft 15 and supports a crank unit 28 depending from the stub shaft 16 as shown in Figure 1. The crank unit 28 comprises inner and outer spaced arms 29 and 30, the former of which may be formed integrally with the arm 25 of the unit 23 and lying in a common plane therewith, as shown in Figures 3 and 4.

A bracket arm 32 is welded to the vertical bracket flange 11 and carries an adjusting screw 33 threaded through jamb nuts 34 and 35 on opposite sides of the bracket arm 32. The screw 33 carries a pad 36 engaging a plate 37 welded to the arms 29 and 30, the pad 36 thus limiting swinging movement of the crank unit 28 in a clock-wise direction to the "off" position shown in solid lines in Figure 1.

The upper ends of the arm units 22 and 23 are respectively provided with pivot pins 40 and 41 extending through the arms of the units for connecting such units to a brake operating rod 42 which takes the place of the conventional brake pedal. This rod projects through an opening 43 in a conventional toe board 44, there being a corresponding opening in the conventional rubber floor and toe board mat (not shown). The opening in the floor board and mat is conventionally relatively small, which is practicable in view of the fact that the upper end of a conventional brake pedal is formed arcuately and concentric with the turning axis of the pedal. This permits the edges of the opening in the mat to fit relatively tightly against the upper pedal arm to exclude drafts from entering the driver's compartment. The present construction does not employ an arcuate-armed pedal lever but is so constructed as to permit the use of conventional toe board and mat openings, as described below.

The pedal rod 42 extends between the arm elements of the units 22 and 23 as shown in Figures 3 and 4 and at its rear end is provided with a head 45 covered by the usual rubber pedal pad 46. Between the pedal pad and toe board when the parts are in the "off" position as shown in solid lines, the pedal rod 42 is bowed downwardly as at 47. It will be noted that the line of the brake rod is generally indicated by the line 48, which line, forwardly of the centers of the pivot pins 40 and 41, is at an acute angle to the center lines 49 and 50 of the arm units 22 and 23. Therefore, when the centers of the pins 40 and 41 move forwardly incident to counter clockwise turning movement of the units 22 and 23, the axes of the pivot pins 40 and 41 follow arcs of circles respectively indicated at 52 and 53, concentric with the axes of the respective stub shafts 15 and 16, and the lines 52 and 53 move above the line 48. Thus it will be apparent that when the pedal pad 46 is depressed, the brake arm 42 is bodily elevated until the pins 40 and 41 are midway of their positions between the full "off" positions of the parts and the full brake applied positions indicated by broken lines in Figure 1. Between such mid-points and the full brake-applied positions of the parts, the arcs of the pins 40 and 41 move relatively downwardly toward the line 48, thus bodily lowering the brake rod 42. The bowing of the brake rod as at 47 compensates for the bodily movement of the brake rod in following the arcs of the pins 40 and 41 and this bowing can be so accurately designed that any portion of the brake rod projecting through the opening 43 will occupy the same position relative to this point as every other portion of the brake rod passing through such opening. Accordingly this opening and the opening in the floor pad may be of conventional limited size.

As shown in Figure 1, the toe board 44 at its lower extremity is turned rearwardly to form the usual floor board 55. The operator's right shoe 56 is shown in solid lines engaging the pedal pad 46 with the parts in "off" position and in broken lines in the brake-applied position. The operation of the device is such that the operator may rest the heel of his shoe at one point, for example, the point 57 on the floor board 55 while moving the brake pedal between its extreme positions. It will be noted that the distance from the point 57 to the pedal pad remains approximately equal throughout the pedal pad travel, the line of travel of the pedal pad being approximately an arc having its center at the point 57, as indicated by the broken line 58.

The arm 25 of the unit 22 is provided with an opening 60 and the arm 30 of the crank unit 28 is provided with a similar opening 61. A tension spring 62 is connected between these openings. As will be obvious in Figure 1, the arms to which the spring 62 is connected move apart as the pedal is depressed, thus lengthening the spring 62, and accordingly this spring acts as a return spring for the units 22, 23 and 28. The spring also tends to take up any play in the pivot pins, thus preventing any rattling where the pivot points occur.

As previously stated, the present device is particularly adapted for use with a booster brake mechanism which, in most present installations, is arranged beneath the floor board of the vehicle in view of the fact that more space is available at such point. In this connection it may be pointed out that there are two general types of booster brakes in use, one of which embodies a master cylinder forwardly of the toe board from which fluid is manually displaced to operate the booster motor arranged at a remote point wherever space is available. In another type, the entire booster unit is arranged forwardly of the toe board. This type, while desirable for economic reasons, is becoming more and more obsolete because of the lack of space available for its installation. Where efforts are made to use a single booster unit beneath the floor board, pivoted brake pedals have been employed for their operation with the disadvantage referred to above where it is desired to use a low treadle. The present device permits the placing of a booster unit conveniently beneath the floor boards, thus permitting the use of the most economical type of booster using only a single master cylinder. The booster unit forms no part per se of the present invention and accordingly has not been illustrated in its entirety. However, this unit is provided with an operating rod 65 (Figure 1) the forward end of which extends between the arms of the crank unit 28 and is pivotally connected thereto as at 66. The rod 65 extends rearwardly to the booster unit (not shown) and is surrounded by the usual boot 67 connected at its forward end to the rod 65 and at its rear end to the booster unit to exclude dust and other foreign matter from the booster unit.

*Operation*

The operation of the mechanism will be apparent from the foregoing description. Whereas the conventional brake pedal is a lever having an arm projecting along and parallel to the forward and lower face of the toe board with a rearwardly extending pedal pad arm formed concentric with the rocking axis of the pedal, the present device employs a rod 42 of the character described. This rod does not turn about a single rocking axis but is pivotally supported at two spaced points by the pivot pins 40 and 41 carried by the arm units 22 and 23. The arm units in turn are supported for rocking movement from the respective axes of the stub shafts 15 and 16. The axes of the elements 15 and 16 and 40 and 41 do not form exactly a parallelogram since the arm unit 23 is slightly longer than the arm unit 22 and the center line 49 inclines upwardly and rearwardly slightly toward the center line 50 of the arm unit 23. The locations of these axes are such that the pedal pad 46 is caused to move always substantially in an arc of a circle (see line 58) having its center at the point 57 at which the heel of the operator's shoe 56 engages the floor board 55.

To operate the brake, therefore, it merely is necessary for the operator to place his foot in the position shown in solid lines in Figure 1 and then rock the foot about the pivot point 57 to apply the brakes. It is not necessary for him to either slide his foot along the floor board or raise or lower his foot during any portion of the path of travel of the pedal pad. A brake-applying motion of the pedal pad 46 to the left from the solid line position in Figure 1 rocks the arm units 22 and 23 in a counterclockwise direction to similarly move the crank unit 28, thus moving the rod 65 rearwardly to control the booster unit and apply the brakes. The brakes may be applied to any extent and during any such movement the heel of the shoe will remain in contact with the floor board at the point 57.

Movement of the parts to the "off" positions is limited by the adjustable pads 36 (Figure 1) and return movement of the parts is assisted by the spring 62. Grease fittings may be provided for any of the pivot points and conventional fittings have been shown in conjunction with the stub shafts 15 and 16 but need not be described. Such fittings can but need not be used for the pins 40 and 41. These pins can be conveniently conventionally lubricated from time to time. Any tendency for play to occur with consequent rattling between the pins 40 and 41 and the elements through which they pass is eliminated by the spring 62 which will keep all such play taken up.

In a low pedal installation employed in conjunction with a booster, long pedal pad travel is unnecessary and in practice the pedal pad 46 may be arranged substantially at the same height as the contact point of the foot with the accelerator treadle. Therefore, it not only is possible to operate the present device by the forward and rearward rocking of the foot about the point 57, but it is also possible for the operator to operate the accelerator with the toe of his foot inclined forwardly and to the right for operating the accelerator and then rock the foot along the line of the bottom of the heel transversely of the vehicle to slide the sole of the shoe directly across on to the pedal pad 46 for the operation of the brakes. The present device, therefore, greatly facilitates brake operation and eliminates a number of the movements which previously have been required for the transfer of the foot from the accelerator to the brake pedal and for operating the brake pedal.

We claim:

1. In combination with a vehicle toe and floor board and a vehicle accessory having an operating element below the level of the floor board, a treadle rod projecting through said toe board and provided rearwardly of the latter with a foot-engaging pad, a fixed support below said treadle rod and forwardly of and beneath the toe board, spaced horizontal parallel forward and rear stub shafts carried by said support, forward and rear arms mounted to turn on the respective stub shafts and projecting upwardly therefrom, spaced horizontal pivot elements connecting the upper ends of said arms to said treadle rod, said forward arm being shorter than said rear arm and said arms converging upwardly whereby said pivot elements are spaced apart a distance shorter than the distance between said stub shafts to predetermine movement of said pad in a substantially arcuate path substantially concentric with a predetermined point on said floor board adjacent said toe board, at which point the heel of the operator's shoe will rest on the floor board, and means for transmitting movement from one of said arms to said operating element.

2. In combination with a vehicle toe and floor board and a vehicle accessory having an operating element below the level of the floor board, a treadle rod projecting through said toe board and provided rearwardly of the latter with a foot-engaging pad, a fixed support below said treadle rod and forwardly of and beneath the toe board, spaced horizontal parallel forward and rear stub shafts carried by said support, forward and rear arms mounted to turn on the respective stub shafts and projecting upwardly therefrom, spaced horizontal pivot elements connecting the upper ends of said arms to said treadle rod, said forward arm being shorter than said rear arm and said arms converging upwardly whereby said pivot elements are spaced apart a distance shorter than the distance between said stub shafts to predetermine movement of said pad in a substantially arcuate path substantially concentric with a predetermined point on said floor board adjacent said toe board, at which point the heel of the operator's shoe will rest on the floor board, a depending operating arm fixed at its upper end to said rear arm and pivotally connected at its lower end to said operating element, and a tension spring connected between said operating arm below said rear stub shaft and said forward arm above said forward stub shaft to bias said arms rearwardly to tend to hold said pedal pad in a normal position substantially spaced from said toe board.

References Cited in the file of this patent

UNITED STATES PATENTS

| 616,534 | Hardingham | Dec. 27, 1898 |
| 1,159,524 | Mills | Nov. 9, 1915 |
| 1,489,711 | O'Neil | Apr. 8, 1924 |
| 1,581,738 | Higgins | Apr. 20, 1926 |
| 1,817,943 | Rockwell | Aug. 11, 1931 |
| 2,081,126 | Dausman | May 18, 1937 |
| 2,239,439 | Crannell | Apr. 22, 1941 |
| 2,534,435 | Ghurye | Dec. 19, 1950 |
| 2,547,593 | Morris | Apr. 3, 1951 |
| 2,557,758 | Perry | June 19, 1951 |

FOREIGN PATENTS

| 426,984 | Italy | Nov. 10, 1947 |
| 688,182 | France | May 6, 1930 |